(12) United States Patent
Ahmed

(10) Patent No.: US 10,330,785 B2
(45) Date of Patent: Jun. 25, 2019

(54) METHOD AND SYSTEM FOR MILLIMETER-WAVE IMAGE RECONSTRUCTION

(71) Applicant: Rohde & Schwarz GmbH & Co. KG, Munich (DE)

(72) Inventor: Sherif Sayed Ahmed, Munich (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 283 days.

(21) Appl. No.: 14/683,762

(22) Filed: Apr. 10, 2015

(65) Prior Publication Data
US 2015/0293221 A1    Oct. 15, 2015

(30) Foreign Application Priority Data

Apr. 14, 2014 (EP) .................................. 14164588

(51) Int. Cl.
| | |
|---|---|
| G01S 13/02 | (2006.01) |
| G01S 13/89 | (2006.01) |
| G01S 13/88 | (2006.01) |
| G01S 13/42 | (2006.01) |
| G01S 13/90 | (2006.01) |

(52) U.S. Cl.
CPC ............ *G01S 13/89* (2013.01); *G01S 13/02* (2013.01); *G01S 13/887* (2013.01); *G01S 13/426* (2013.01); *G01S 13/90* (2013.01)

(58) Field of Classification Search
CPC ................................ G01S 13/89; G01S 13/02
USPC .................................................. 342/22, 178
See application file for complete search history.

(56) References Cited

U.S. PATENT DOCUMENTS

| | | | | |
|---|---|---|---|---|
| 8,060,339 B2* | 11/2011 | Ammar | .................. | G01S 7/411 342/22 |
| 8,497,797 B2* | 7/2013 | Lee | ........................ | H01Q 21/06 342/179 |
| 2004/0140924 A1* | 7/2004 | Keller | ................ | G01N 21/3581 342/22 |
| 2006/0066469 A1* | 3/2006 | Foote | .................... | G01S 13/003 342/22 |
| 2006/0273255 A1* | 12/2006 | Volkov | ..................... | G01S 7/024 250/336.1 |
| 2007/0013575 A1* | 1/2007 | Lee | ........................ | G01S 7/2813 342/52 |
| 2008/0166115 A1* | 7/2008 | Sachs | ..................... | G03B 17/00 396/55 |
| 2009/0295618 A1* | 12/2009 | Beeri | .................... | G01S 13/888 342/22 |
| 2010/0220001 A1* | 9/2010 | Longstaff | ................ | G01S 7/414 342/22 |
| 2013/0093611 A1* | 4/2013 | Crowley | ............... | G01S 7/4026 342/22 |

(Continued)

*Primary Examiner* — Marcus E Windrich
(74) *Attorney, Agent, or Firm* — Christensen O'Connor Johnson Kindness PLLC

(57) ABSTRACT

The invention relates to a technique for millimeter-wave active image reconstruction. According to a method aspect, Tx subgroups of transmitting antennas of an antenna array are established. Coherent processing of measurement data is performed for each Tx subgroup and coherent subimages are achieved. Magnitudes of complex numbers are calculated to obtain a magnitude subimage for each of the coherent subimages and an object image is generated by adding the magnitude subimages.

15 Claims, 9 Drawing Sheets

(56) References Cited

U.S. PATENT DOCUMENTS

| | | | |
|---|---|---|---|
| 2014/0125517 A1* | 5/2014 | Ahmed .................. | G01S 7/411 342/25 A |
| 2015/0022390 A1* | 1/2015 | Mansour ............... | G01S 13/888 342/22 |
| 2015/0061928 A1* | 3/2015 | Cornic et al. ......... | G01S 13/343 342/25 R |

* cited by examiner

METHOD AND SYSTEM FOR MILLIMETER-WAVE IMAGE RECONSTRUCTION

PRIORITY

This application claims priority of European patent application EP 14 164 588.7 filed on Apr. 14, 2014.

FIELD OF THE INVENTION

The invention relates to a method for reconstructing an image of an object based on illuminating the object with millimeter waves, a computer program implementing such method, and a corresponding imaging system.

BACKGROUND OF THE INVENTION

Electromagnetic radiation with wavelengths in the millimeter and/or micrometer range is reflected by metallic materials and a number of non-metallic materials such as ceramics or specific plastic materials. Air and many other materials such as, for example, clothing materials are transparent for such radiation. The radiation is also non-ionizing, and therefore millimeter waves are particularly suited for contactless detection of, for example, objects which may be hidden under a person's clothing. Millimeter-wave scanning systems can complement or replace other detection systems such as metal detection systems employed for security gates at airports, football stadiums, etc.

The term 'millimeter waves' as used herein may also cover micrometer waves, i.e. electromagnetic radiation in the Gigahertz (GHz) and Terahertz-range (THz). Corresponding scanning systems are operable to reconstruct an image of a person and/or object and may comprise for said purpose an array formed of a plurality of transmitting antennas and an array formed of a plurality of receiving antennas, wherein the arrays may be separate or may overlap. For example, an overlapping aperture may result from arranging transmitter and receiver antennas at a common panel.

One object to be scanned is then illuminated with millimeter waves transmitted from each of the transmitting antennas; for example, the transmitting antennas may be controlled to transmit radiation one after the other. In a multistatic mode, all available receiving antennas may be operable to detect radiation, which is assumed to comprise radiation of the currently active transmitting antenna reflected by the object to be scanned. Often, the sequence of transmission antennas is traversed multiple times with different frequencies according to a given frequency vector.

The measurement data may represent amplitude and phase information of the detected received radiation, even if not stored explicitly in such format, but in another complex-type format as known for signal processing. Image reconstruction may be performed by performing complex operations on the complex-valued measurement data wherein a final object image may be obtained by pixel-wise calculating magnitude values from complex number representations.

Systems for scanning objects such as persons have to tolerate object movements or motions to some extent. For example, there is a general requirement for convenient walk-through scanning systems. However, image blurring may occur if during the measurements a person or other imaged object moves a distance of the order of the scanning wavelength. For currently available systems, movements such as typical for walk-through scanning can lead to serious image blurring, i.e. ideally a person to be scanned should stand still during scanning. Optimizations are therefore required.

A. Schiessl, S. S. Ahmed, and L.-P. Schmidt, "Motion Effects in Multistatic Millimeter-Wave Imaging Systems," in *Proc. SPIE* 8900, *Millimeter Wave and Terahertz Sensors and Technology VI*, 2013 describe and discuss the problem of short measurement times which should allow scanning people in uninterrupted, normal comfortable movement. Several measures are recommended. For example, it is proposed to replace system with mechanical focusing by fully electronic systems without moving parts, but with digital beamforming for focusing transmitted and/or receiving antennas. Forced application of multistatic configurations allows operating many receiving antennas in parallel which can also contribute to reducing measurement times as compared to monostotic configurations. High-performance electronic components and subsystems should be employed, however, such components are available at high costs only and/or are not available to date. Still further approaches are required.

In the millimeter-wave image reconstruction field, there is a need for an approach for minimizing image blurring in case of a moving person or object to be scanned, which approach should preferably be appropriate for being implemented cost-efficiently, for example based on existing hardware.

SUMMARY OF THE INVENTION

According to one aspect of the invention, a method for reconstructing an image of an object comprises illuminating the object by transmitting millimeter-wave and/or micrometer-wave radiation from an array of transmitting antennas; detecting signals of radiation reflected by the object with a n array of receiving antennas and representing the detected signals by complex-numbered measurement data (reception data); and performing coherent processing of the measurement data including complex number computations for image reconstruction. Further, Tx subgroups of transmitting antennas are established for which coherent processing is performed to achieve coherent subimages. Magnitude values each indicative of a magnitude of a complex number are calculated to obtain a magnitude subimage for each of the coherent subimages. The object image is generated by adding the magnitude subimages.

One or more Tx subgroups may be established for collection of the measurement data, wherein, for example, one or more transmitting antennas predefined to belonging to a Tx subgroup are specifically controlled and a transmission pattern is applied which includes all transmitting antennas of the Tx subgroup and all frequencies of a given transmission frequency vector. Additionally or alternatively, one or more Tx subgroups may be established for data processing, wherein, for example, measurement data representing radiation transmitted from transmitting antennas of a Tx subgroup and reflected by the object to be scanned is specifically processed. The specific processing may comprise coherent processing of said measurement data.

The Tx subgroups are measured preferably in sequential order, which may imply that all antennas of a Tx subgroup are measured sequentially and/or in parallel, within a single, contiguous, non-overlapping time period, and that such operation is performed for each Tx subgroup. The total measurement time may be constituted by the sum of the measurement times for the Tx subgroups in case of vanishing time gaps between measuring the subgroups.

Within a given Tx subgroup a nesting of switching between antennas and switching between frequencies is a matter of optimization depending on various circumstances. It may however be generally intended that measurement times per Tx subgroup are minimized, as said measurement times govern the image blurring. Therefore any time gaps which may occur between and/or due to switching, of the antennas and/or frequencies are to be minimized.

As an example, in an existing system implementing an efficient control of switching from antenna to antenna, and perform for each antenna a complete frequency sweep, use of said efficient control mechanism may be continued within the Tx subgroups. As another example, a parallel transmission in time of two or more transmitting antennas of a Tx subgroup can, be established by slightly displacing the transmitting frequencies thereof, which enables minimizing illumination times/measurement times per Tx group.

According to some embodiments, when operating a transmitting antenna, all receiving antennas may be involved in detecting reflected signals, i.e. a multistatic mode. According to other embodiments, a modified, multistatic mode may be applied, wherein for a Tx subgroup a corresponding Rx subgroup comprising one or more receiving antennas of the receiving antenna array is established. Only the receiving antennas of the associated Rx subgroup may contribute to achieving the coherent subimage of the Tx subgroup.

Rx subgroups complementing the Tx subgroups may be defined to limit local and/or central processing resource usage, and can be understood as a specific way of limited multistatic operation.

A specific associated. Rx subgroup may be defined for one or more Tx subgroups, for example for each Tx subgroup. For each Tx subgroup an associated Rx subgroup may be established, which may imply one or more of one and the same Rx subgroup being established for more than one Tx subgroup, Rx subgroups overlapping each other, and a receiving antenna belonging to more than one Rx subgroup.

The transmitting antennas of a Tx subgroup and the receiving antennas of the associated Rx subgroup can be assigned an effective aperture. According to various embodiments, various Tx subgroups and their corresponding associated Rx subgroups provide for a set of effective apertures which set fully covers an aperture of the entire transmitting antenna array and/or receiving antenna array.

According to some embodiments, phase values of one or more of the coherent subimages are provided as the basis for estimating phase values for the object image. Said estimation may contribute to minimize effects of phase loss due to incoherent addition of the subimages, i.e. adding the magnitude subimages of the coherent subimages to achieve the final object image.

Fully coherent data processing conventionally comprises implicit or explicit complex addition of the images generated from illumination by all transmission antennas. According to various embodiments, partially incoherent processing includes that complex image adding is performed only for a Tx subgroup.

According to various embodiments, the calculation of magnitude values may comprise calculating a magnitude of a complex number, a square of a magnitude, for example by adding squares of imaginary and real parts of a complex number representation, or any other value which is indicative of a magnitude of the complex number.

The abovementioned need is further satisfied by a computer program which comprises program code portions for performing the steps of one or more of the methods and method aspects described herein when the computer program is executed on one or more computing devices, which may include for example a local processing unit associated with an antenna or antenna cluster, a central processing unit to which transmitting/receiving antenna, arrays are connected, or both. The computer program product may implement an image reconstruction algorithm provided with a system such as a personal scanner.

Any of the methods, method steps, algorithms, discussed herein may be implemented as hardware, firmware, software, or combinations thereof. For example, a software or firmware may be provided on an erasable programmable ROM (EPROM) or a similar semi-permanent or permanent storage area of an ASIC, DSP or other specific or general purpose processor implementing an APU or CPU as described herein.

The computer program may be stored on a computer readable recording medium, such as a permanent or re-writeable memory within or associated with a computing device or a removable CD-ROM, DVD or USB-stick. Additionally or alternatively, the computer program may be provided for download to a computing device, for example via a data network such as the Internet or a communication line such as a telephone line or wireless link.

The above-mentioned need is further satisfied by a system for reconstructing an image of an object, which comprises an array of transmitting antennas adapted to illuminate the object by transmitting millimeter-wave and/or micrometer-wave radiation, and an array of receiving antennas adapted to detect signals of radiation reflected by the object. At least one component may be provided which is adapted to represent the detected signals by complex-numbered measurement data. At least one component may be provided, which is adapted to perform, coherent processing of the measurement data including complex number computations for image reconstruction. Further, at least one component may be provided which is adapted to establish Tx subgroups of transmitting antennas for which coherent processing is performed to achieve coherent subimages. At least one component may be provided which is adapted to calculate magnitude values each indicative of a magnitude of a complex number to obtain a magnitude subimage for each of the coherent subimages and generate the object image by adding the magnitude subimages.

The transmitting antennas assigned to a Tx subgroup can be neighboring to each other and/or can be distributed over the transmitting antenna array such that various Tx subgroups have overlapping or entangled effective apertures. However, according to various embodiments an overlap in Tx subgroup apertures, Rx subgroup apertures, and/or effective apertures may be minimized in order to minimize at least one of measurement times and processing times.

Preferably, the number of transmitting antennas in any Tx subgroup is considerably less than the number of transmitting antennas in the transmitting antenna array, and comprises, for example, less than halve of the total number of antennas. Preferably, in order to considerably shorten the effective illumination time contributing to image blurring in comparison to the total measurement time, the number of transmitting antennas in a Tx subgroup is 35% or less of the total number of transmitting antennas in the array or system, or is 25% or less, or is 15% or less, or is 10% or less.

Preferably, each transmitting antenna of the system belongs to at least one Tx subgroup. More preferably, each transmitting antenna belongs to exactly one Tx subgroup. According to various embodiments, the Tx subgroups comprise each one and the same number of transmitting antennas. For example, for a given number n of antennas and number n/m of Tx subgroups, each of the Tx subgroups may comprising antennas.

According to various embodiments, an imaging system can be provided with reflecting surfaces for reflecting transmitted radiation towards the object and/or reflecting radiation reflected from the object towards the array of receiving antennas. Such system may be controlled (operated) as if comprising further antennas, termed 'virtual' or 'mirrored' antennas herein, such virtual antennas be required to reproduce a detection pattern in case of a system without reflecting surfaces. A Tx subgroup may comprise such virtual transmitting antennas.

As the detection of reflected radiation at various receiving antennas can be performed in parallel, there is a minor influence, if any, of the number of receiving antennas per Rx subgroup on the effective illumination time. Consequently, according to some embodiments ail receiving antennas available in the receiving antenna array may be used for detecting and coherently processing reflected radiation from the transmitting antennas of each of one or more Tx subgroups.

According to embodiments having Rx subgroups which have less receiving antennas than available in the array and which are associated to Tx subgroups, a receiving antenna may be allocated to at least one Rx subgroup. Receiving antennas assigned to an Rx subgroup can be neighboring each other, and/or can be distributed over the receiving antenna array such that various Rx subgroups have overlapping or entangled effective apertures. A number of Rx subgroups and of receiving antennas per Rx subgroup may be governed by the intention to limit resource usage for data transmission and/or processing such as data transmission times, which would mean keeping the number of antennas per Rx subgroup associated to a particular Tx subgroup low. On the other hand, the receiving antennas of the Rx subgroup may be employed to minimize a loss of image resolution according to the limited number of transmitting antennas in the corresponding Tx subgroup. Therefore, according to presently preferred embodiments a number of receiving antennas per Rx subgroup is selected to be at least the number of antennas of the associated Tx subgroup, or more.

A data transfer between local and central processing facilities can additionally or alternatively be minimized by setting a predefined threshold value per pixel (the terms 'pixel' and 'voxel', known as such to the skilled practitioner, are used synonymously herein), wherein the threshold may be set for one or both parts of a complex number, comprising real and/or imaginary part, magnitude and/or phase value, etc. Such threshold may be applied, for example, when generating measurement data from reception signals, prior to data transfer to a central processing facility, and/or at other stages of the data processing.

More than one set of Tx subgroups and/or Rx subgroups may be defined for a system. For example, a fully coherent processing (without any subgroups) and one set of one or multiple defined sets may be selected automatically and/or upon manual input by an operator. In case of multiple sets of subgroups being defined, each set may be optimized according to a specific goal which may relate, for example, to a specifically optimized trade-off between image blurring and image resolution. According to various embodiments, switching between different sets may be performed even after the measurement phase has been terminated, wherein different ways of data, processing may be applied on one and the same set of raw measurement data. For said embodiments, an operator may switch between a higher resolution, but blurred object image as generated, for example, from fully coherent processing, and a lower resolution, but unblurred object image as generated from partially incoherent processing.

According to various embodiments, the receiving antennas of a system array may be clustered, wherein an Rx cluster comprises a subset of ail available receiving antennas. For example, a number n of receiving antennas may be organized in form of m Rx clusters each having n/m receiving antennas. An Rx cluster may have associated thereto a local processing unit (LPU) dedicated to the cluster. Such LPU may be adapted to establish the measurement data from the radiation detected at the receiving antennas.

Similarly to what, has been outlined above, also transmitting antennas of a system array may be clustered in form of Tx clusters. According to various embodiments, an antenna cluster may be provided as a hardware (HW) component, comprising a plurality of receiving antennas, and comprising a plurality of transmitting antennas, such that the transmission array and the reception array of the system may result from an assembly of a plurality of combined Tx/Rx antenna clusters. Such clustered array may be implemented as a sparse array, for example. Generally, a total transmission aperture resulting from such array may be essentially identical to a total reception aperture.

Within such embodiments, for reasons of efficient data collecting and/or processing it can be preferable, though not mandatory, to assign all transmitting antennas of the cluster to one and the same Tx group and/or to assign ail receiving antennas to one and the same Rx group. Vice versa, a Tx subgroup may comprise one or more Tx clusters, and/or an Rx group may comprise one or more Rx clusters. When assigning the transmission antennas of a cluster to a particular Tx subgroup, the receiving antennas of said cluster may be assigned to the Rx subgroup associated to said Tx subgroup. However, this does not exclude that the receiving antennas of further clusters are additionally defined to belong to the Rx subgroup, Generally, in case of clusters comprising both transmitting and receiving antennas, a Tx subgroup and an associated Rx subgroup may comprise the same set of clusters or a different set.

An LPU of a cluster may be adapted to perform at least a part of the coherent data processing. For example, the LPU may operate to generate an image resulting from the transmission of a single transmission antenna and the measurement data resulting from detections at the receiving antennas of the cluster as far as defined to belong to the Rx subgroup associated with the Tx subgroup the transmission antenna is defined to belong to.

Moreover, the LPU may be configured to perform coherent processing to generate an intermediate image resulting from complex addition of all images generated for all single transmission antennas of a Tx subgroup. For such embodiments, the LPU would require information on which transmission, antennas of the system array belong to which Tx subgroup.

According to various embodiments a central processing unit (CPU) is provided. Each of the LPU and the CPU may be implemented on a general purpose device, e.g., microprocessor, and/or a dedicated hardware such as an ASIC or DSP, for example. The CPU may be implemented as a device separate from, but connected to the transmitting/receiving arrays of the system. According to some embodiments, at least one LPU of an antenna cluster has been assigned the tasks of a GPU.

Depending on available processing resources at cluster LPUs and the CPU, the CPU may perform any of the image reconstruction computations or at least a part thereof. According to some embodiments, a generation of measurement data is performed locally at the LPUs, and the CPU is adapted to perform at least a part of the coherent processing. For example, the CPU may be configured to accept intermediate images from a plurality of LPUs and to perform complex adding of multiple intermediate images to generate a coherent subimage for each of the Tx subgroups.

The CPU may be adapted to perform, an image interpolation, for example for mapping intermediate images received from LPUs to a common aperture or image framework. Additionally or alternatively, the intermediate images may be weighted before or after interpolation to achieve a uniform illumination for the object image.

Additionally or alternatively the CPU may be configured to perform an incoherent addition of the coherent subimages, to generate the object image, for example by computing a magnitude subimage for each of the complex-number-based coherent subimages and by addition of said magnitude subimages.

According to some embodiments the system may additionally comprise tracking or positioning sensor equipment, for example one or more tracking sensors or motion sensors such as cameras, photo sensors, etc. The sensor equipment may provide signals representing indications of a location, position and/or posture of the person or object to be scanned. Said signals can be used for interpolation and/or to determine a relative positioning of the magnitude images before adding same which may further add to minimize image, blurring in case of a moving object. Additionally or alternatively, information from said sensor equipment may be used to limit a data transfer and/or data processing as data representing a scanned volume not of interest can be discarded.

According to various embodiments, instead of a fully coherent processing of measurement data gained from multiple antennas for image reconstruction, a coherent processing is performed only for generating subimages related to the radiation detected in response to the illumination from transmitting antennas of Tx subgroups. The coherently generated subimages are then incoherently added together for generating the object image. A coherent processing may be understood, as comprising a complex-numbered treatment of complex measurement data representing explicitly or implicitly a magnitude and a phase of a signal as received at a receiving antenna. An incoherent processing may be understood as a processing disregarding the phase portion of the signal or the measurement data representing said signal or eliminating said phase portion by replacing complex numbers with real numbers representing only, e.g., the magnitudes of the complex numbers. Incoherent processing may be based on real number or integer number processing.

A coherent subimage is generated in response to illumination of only a Tx subgroup of the transmitting antennas of a system, array, and said Tx subgroup can be completely measured within a time span which is shorter than the total measurement time of the entire transmitting antenna array. It is said time span only which is covered by the underlying assumption of a still object as implied by the coherent, i.e. phase-sensitive processing, and said time span can therefore be termed 'effective measurement (illumination) time'.

The longest effective measurement time of all effective measurement times for the various Tx subgroups or coherent subimages can be understood as representing also the effective measurement time for the ultimate object image. For that reason, it can be preferred that the various Tx subgroups may have all the same (short) effective measurement time. In case of the effective measurement times be considerably shorter than the total measurement time for the entire transmission array, any given motion effect has correspondingly less influence on image quality. In particular, it turns out that incoherent processing enables avoiding image blurring to a large extent when scanning a person in walking motion with a given system, although such blurring is present when performing conventional, fully coherent image reconstruction with said same system.

Compared to a fully coherent image reconstruction based on the entire illumination array, an image reconstruction resulting from incoherent addition of coherent subimages generated from Tx subgroups only may tend to degrade an image resolution in lateral and/or longitudinal direction. For example, phase information is neglected, which may result in a lower resolution in longitudinal direction, i.e. in a direction perpendicular to a plane of an antenna array. Adverse effects on resolution can however be minimized by various measures, which may include, for example, defining Tx subgroups and/or corresponding Rx subgroups with a sufficient, desired aperture, by providing an estimate for the phases in the final object image, and/or by providing both a conventional fully coherent image reconstruction and at least, one partially incoherent image reconstruction to let a user or operator switch thereinbetween.

Various embodiments can be implemented based on existing and cost-efficient hardware and/or software. For example, an incoherent processing approach may be implemented on an existing scanning system as a software upgrade.

BRIEF DESCRIPTION OF THE DRAWINGS

In the following, the Invention will further be described with reference to exemplary embodiments illustrated in the figures, by way of example only. In the drawings

DETAILED DESCRIPTION OF THE DRAWINGS

Figure 1A:
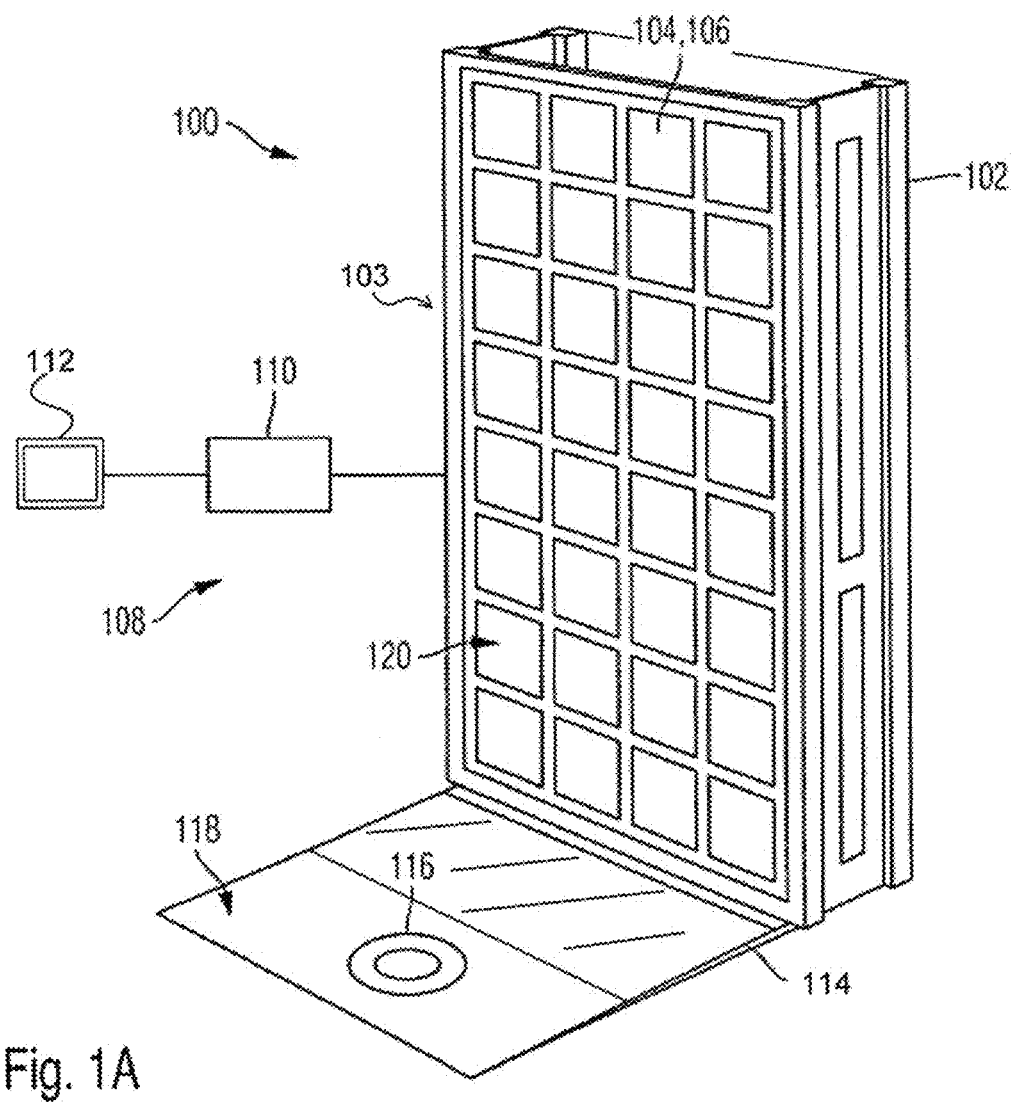
FIG. 1A is a high-level view on an embodiment of a system for image reconstruction.

FIG. 1A schematically illustrates an exemplary embodiment of a system 100 for image reconstruction. The system 100 is assumed to implement a scanning system for scanning objects such as persons when passing a security gate, for example at an airport. The term 'object' as used herein is to be understood as referring to any object, which might be subjected to an image reconstruction process; in the example of FIG. 1A such object may comprise a person as well as inanimate objects, for example objects which a person may carry or wear in or below a clothing, in pockets, etc. The system 100 is intended to enable a convenient contact-free scanning of persons, wherein such scanning may in many cases replace a manual scanning.

The system 100 comprises a panel (frame construction) 102 supporting a common array 103 of a plurality of transmitting antennas 104 and a plurality of receiving antennas 106, The transmitting antennas 104 are adapted to illuminate an object located in an imaging area (scanning or scanned volume) 108 in front of the panel 102, more precisely the array 103. For illumination, the antennas 104 emit (transmit) millimeter-wave and/or micrometer-wave radiation, i.e. electromagnetic radiation in a sub-Terahertz (THz) and/or THz range, e.g. in a range between 1 Gigahertz (GHz) and 1 Terahertz (THz). As a specific example, transmission frequencies may be selected in a range between about 70 Gigahertz (GHz) and about 80 GHZ.

The receiving antennas 106 are adapted to detect signals of radiation in the above-indicated wavelength/frequency ranges. Specifically, the receiving antennas 106 may be adapted to receive radiation emitted, from the transmitting antennas 104 and reflected from any object in scanning volume 108.

The transmitting 104 and receiving 106 antennas of common array 103 are arranged in form of a plurality of common Tx/Rx antenna clusters 120. All available antennas 104, 106 are assumed to be arranged within one of the clusters 120, i.e. there are no further antennas outside of the clusters 120, and all clusters 120 are assumed to be identical with respect to hardware configuration. Other embodiments can be contemplated which depart from these assumptions.

Figure 1B:
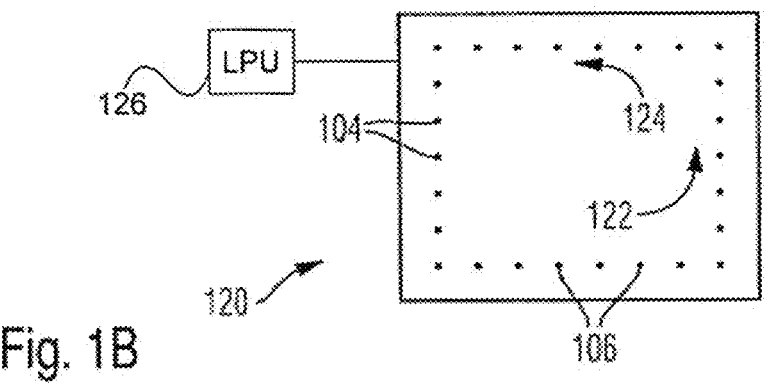
FIG. 1B is a respective block diagram for the image reconstruction shown in FIG. 1A.

FIG. 1B schematically illustrates an arrangement of antennas within one antenna cluster 120 when viewed from scanning volume 108. Each cluster 120 comprises a plurality of transmitting antennas 104 and receiving antennas 106. In the illustrated example the transmitting antennas 104 are arranged in a pattern 122 of vertical lines and the receiving antennas 106 are arranged in a pattern 124 of horizontal lines. Other patterns can readily be contemplated by the skilled practitioner.

It is assumed that each cluster 120 has associated thereto, a local processing module or local processing unit (LPU) 126 which is merely functionally indicated in FIG. 1B and may be mounted, e.g., on a backside of the cluster in practical implementations. The LPU 126 may be adapted to control the transmitting antennas 104 which may include, e.g., driving the transmitting antennas 104 to emit radiation according to a desired transmission scheme (pattern) in time and/or frequency. Additionally or alternatively, LPU 126 may further be adapted to control, e.g., the receiving antennas 106 which may include, e.g., recording signals due to radiation received at the antennas 106 at desired time points and/or desired frequencies, wherein the detected radiation may be represented by electric analog and/or digital signals. The LPU 126 may be further operable to represent detected signals by measurement data, the latter comprising complex-valued (complex-numbered) data, as is readily known to the skilled practitioner, wherein the complex data may implicitly or explicitly represent amplitude and phase of detected signals.

Referring back to FIG. 1A, system 100 comprises a central processing unit (CPU) 110 which is termed 'central' or 'central computer' as it is not, or not necessarily, associated with any specific of the clusters 120, but is directly or indirectly connected with regard to data transfer to all 32 LPUs 126 of system 100. The CPU 110 is adapted to control the antennas 104, 106, for example by controlling the LPUs 126 which in turn may drive transmitting antennas 104 and read out receiving antennas 106 accordingly. Further, based on measured and optionally pre-processed data transferred from the LPUs, the CPU 110 is adapted for generating an image of any object present in volume 108 during illumination time.

The CPU 110 may serve a terminal 112 for receiving input commands from operator personnel and/or for presentation of generated object images.

A marking point 116 and/or marked area 118 on the floor in front of panel 102 may denote a point/area to stand or walk about for a person to be scanned. An area 114 in front of the panel may comprise one or more reflection elements for reflecting radiation transmitted by the panel 102 and/or reflected by a scanned object and to thereby improve an illumination of the object.

Figure 2:
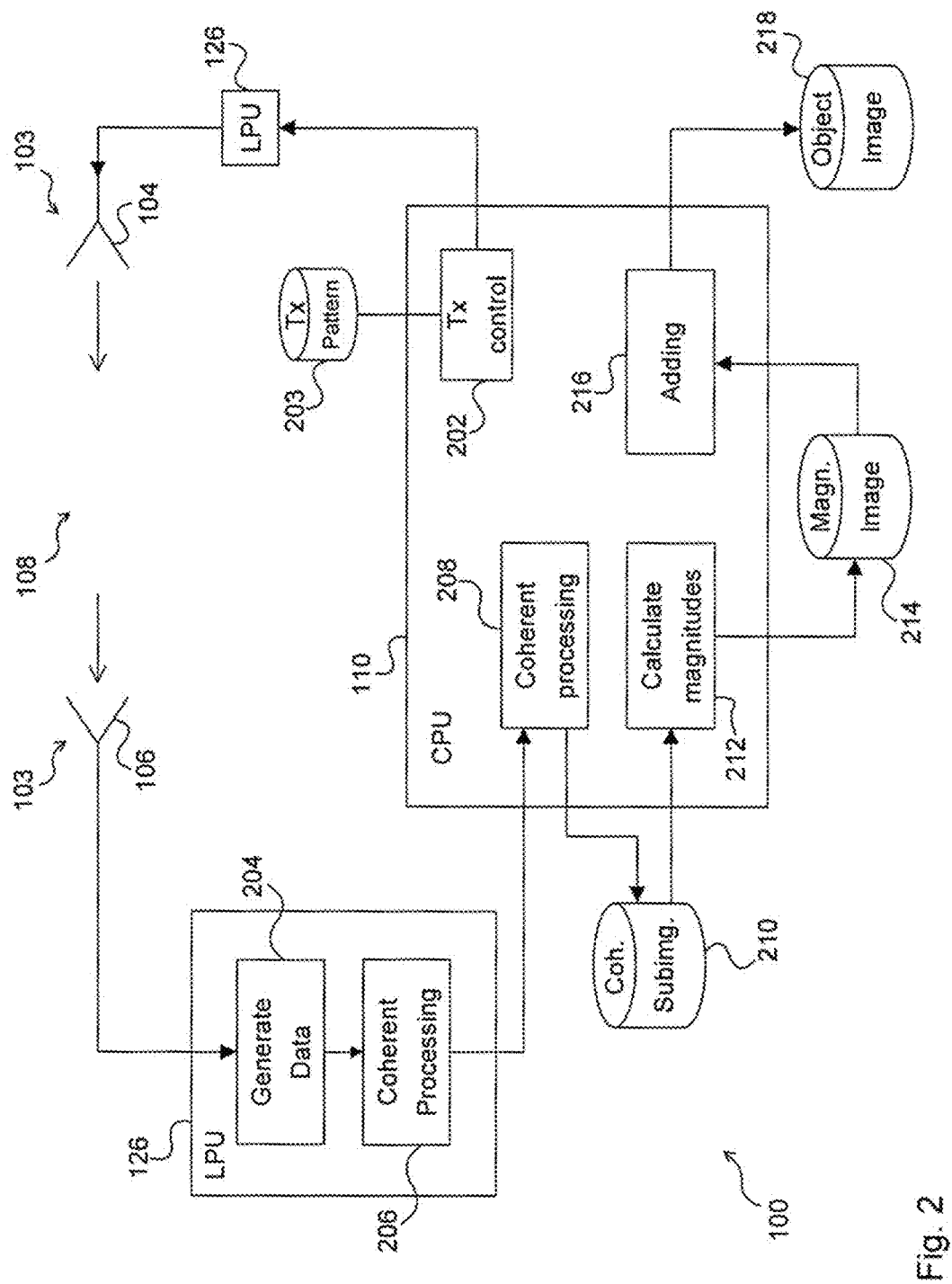
FIG. 2 illustrates functional components of the system of FIG. 1 according to an exemplary embodiment of the invention.

FIG. 2 illustrates functional, components of an embodiment of system 100. From array 103, merely a single transmitting antenna 104 and a single receiving antenna. 106 are illustrated for reference purposes, wherein for sake of conciseness it is assumed that the antennas may belong to one and the same cluster 120, The LPU 126 thereof is however drawn twice purely for sake of clarity.

An operation of system 100 as embodied according to FIGS. 1A, 1B and 2 will further be described with reference to the flow diagram of FIG. 3. Generally, the system 100 is operable 300 to reconstruct an image of an object as may be present in scanning volume 108 during an illumination operation.

In step 302, volume 108 (and any object located therein) is illuminated by the antennas 104. With specific regard to one cluster 120, CPU 110 may control the LPU 126 of said cluster 120 to drive antennas 104 thereof to transmit millimeter-wave and/or micrometer-wave radiation. The CPU 126 is depicted to comprise a Tx control component 202 in this respect, which may for example submit indications of time slots and transmission frequencies to LPU 126, which may in turn accordingly drive the plurality of transmission antennas 104 of the cluster 120. Transmission patterns (schemes) may be stored and retrieved from a repository 203. Details of corresponding transmission schemes, will be discussed in more detail below.

In step 304, radiation is detected by receiving antennas 106, wherein detection equipment thereof is accordingly controlled by component 202 adapted to operate as an Rx control component. Patterns stored in repository 203 may also comprise Rx reception patterns. Detection control is however not further illustrated in FIG. 2 for reasons of conciseness. Detected radiation is recorded by accordingly generating at desired time points electric signals in analogue and/or digital form to in this way represent radiation transmitted by antennas 104 and reflected by a scanned object.

The LPU 126 may accordingly comprise components such as one or more mixer modules, local oscillators, A/D-converter units, etc., known as such. Explicitly shown in FIG. 2 is merely a component 204 which may be adapted to represent amplitude and phase, for example, of detection signals in the form of complex-numbered (more generally, two-dimensional) measurement data.

In step 306, one or both of LPU 126 and CPU 110 perform coherent processing of the collected measurement data. Coherent processing modules 206 and 208 in LPU 126 and CPU 110, respectively, are provided to perform coherent processing. The coherent processing may refer to computations wherein one or more complex numbers are received, a processing thereof is performed according to complex-number handling or vector handling for two-dimensional vectors, and providing one or more complex numbers as a result. Specifically, coherent processing may include that phases of the received signals are accounted for implicitly or explicitly.

Step 306 may in particular include coherent processing 308 to achieve coherent subimages for predefined Tx subgroups of transmitting antennas. The concept of Tx subgroups will further be described and exemplified below. The coherent subimages of various Tx subgroups may be buffered in a storage component 210 associated to CPU 110.

In step 310, incoherent processing is performed on the coherent subimages. Specifically, a component 212 operates to calculate magnitude values of complex numbers which may include calculating for each complex number value assigned to a pixel (voxel) of a coherent subimage the corresponding magnitude value (absolute value, modulus), or the square of the magnitude, or any other value indicative of the magnitude of the complex number, and assigning the calculated magnitude value to said pixel. As a result, a magnitude subimage may be generated for each coherent subimage. Depending on the details of data representation in LPU 126/CPU 110, calculating the magnitude may simply mean extracting the magnitude value (or, e.g., a square thereof, if preferable from a processing efficiency perspective) from a two-dimensional magnitude/phase value representation, or may mean calculating a square (or square root) of the squares of real and imaginary part of a complex number representation. Other ways of calculating a magnitude value indicative of the magnitude, of a complex number can readily be contemplated by the skilled practitioner.

The magnitude images may be buffered in a storage component 214. A component 216 may operate to generate the final object image by adding the magnitude subimages of buffer 214. In a simple example the various magnitude subimages may be added pixel by pixel (voxel by voxel). However, it is noted that the coherent subimages are generated from various different effective apertures of the various Tx/Rx subgroups and may therefore differ in aperture, image size, pixel/voxel positions, etc., such that prior to subimage adding an interpolation procedure has to be performed, as will be discussed further below.

In step 312, CPU 110 operates to provide the generated object image to at least one of a storage 218 and a display on terminal 112 (FIG. 1) for presentation to an operator.

Figure 3:
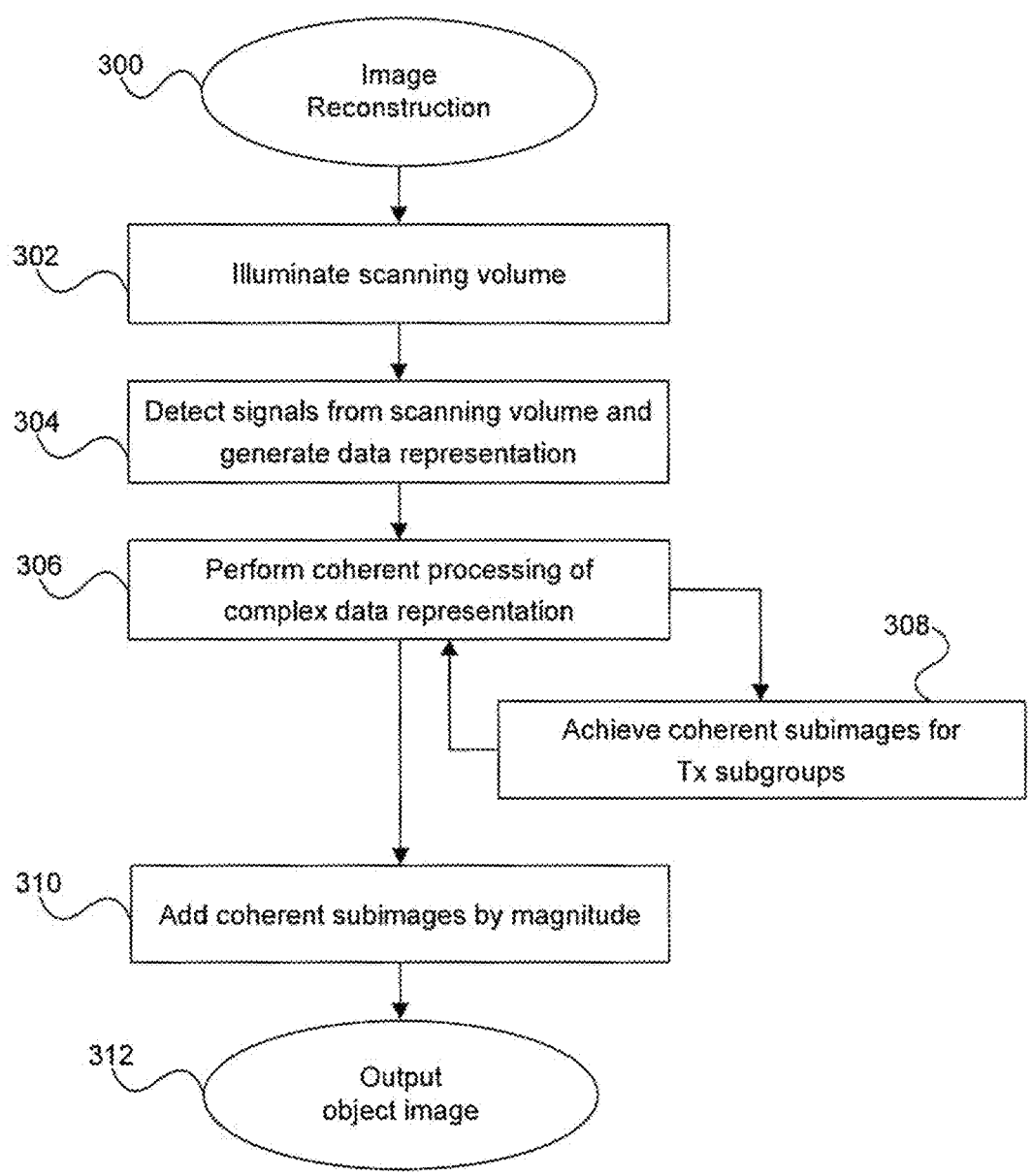
FIG. 3 is a flow diagram illustrating an operation of the system of FIGS. 1 and 2.

While various steps in FIG. 3 are depicted to be performed in sequential order for ease of understanding, a practical implementation may require that various of the steps may have to be performed in parallel, repeatedly, and/or in different order. For example, illumination and detection steps may be performed sequentially for various Tx/Rx subgroups, while for other subgroups measurement phase has been terminated and local coherent processing may be executed by involved LPUs, processed data may be transmitted to the CPU and further processed there, etc.

Figure 4:
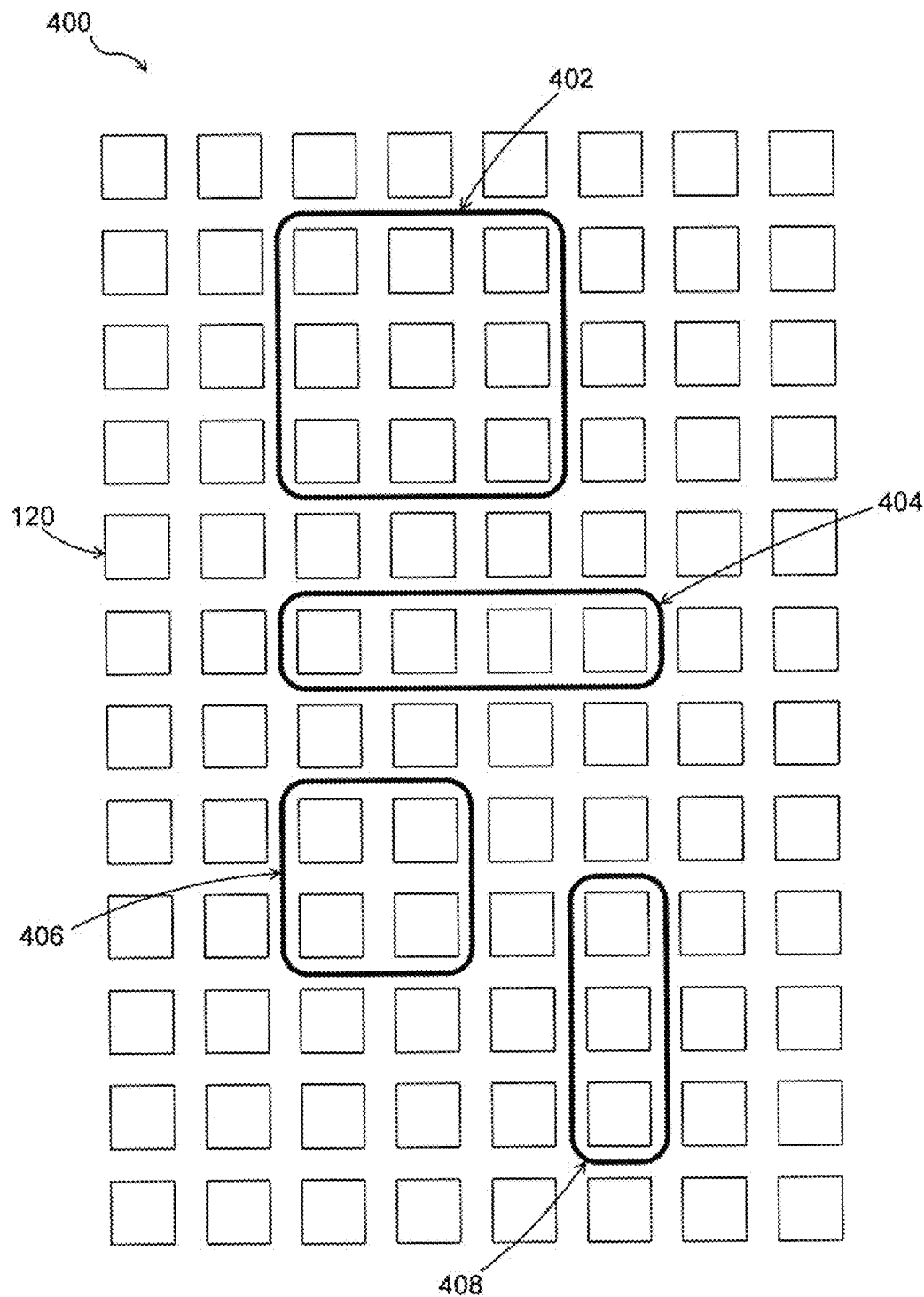
FIG. 4 illustrates various configuration examples of Tx subgroups.

FIG. 4 illustrates a combined transmission/reception array 400 which is assumed to be assembled from multiple clusters 120 similar to what is depicted in FIGS. 1A and 1B for array 100 except that array 400 comprises more clusters 120 for the purpose of illustrating various exemplary Tx subgroups comprising the transmission antennas of various clusters 120 as indicated by thick lines 402, 404, 406 and 408.

It is contemplated that generally Tx subgroups may be defined as including one or more transmission antennas independent of any specifics of how the antennas are provided in an array, such that in case the plurality of transmission antennas of the system is arranged in form of antenna clusters such, as clusters 120, a Tx subgroup may include only some, i.e. a subset of all transmission antennas of a cluster. However, in practical implementations it may be found preferable to define Tx subgroups on the basis of one or more of said clusters for reasons of, for example, operation, processing and/or configuration efficiency as may result from local control facilities available per cluster 120 such as provided by LPU 126.

A Tx subgroup can be contemplated to only comprise the transmission antennas of one cluster (or only one transmission antenna), or can be contemplated to comprise the transmission antennas of all clusters of an array or system except of one cluster for all transmission antennas of the system except of one transmission antenna). According to the exemplary Tx subgroups depicted in FIG. 4, Tx subgroups may include the transmitting antennas of a low number of clusters 120, and may for example comprise 2, 3, or more clusters, and may comprise for example less than 10 clusters. According to presently preferred configurations Tx subgroups may comprise 2, 3 or 4 clusters.

Tx subgroup 402 comprises the transmission antennas of 9 Tx clusters and forms a rectangular, quadratic aperture. Tx subgroup 404 comprises the transmission antennas of 4 clusters and forms another rectangular, linearly extended, aperture. Tx subgroup 406 also comprises the transmission antennas of 4 clusters but forms a quadratic aperture. Tx subgroup 408 comprises the transmission antennas of 3 clusters and forms a rectangular, linear aperture, however with an orientation perpendicular to that of subgroup 404. Other apertures can readily be contemplated, for example non-rectangular apertures formed by staggered arrangement of clusters belonging to a group.

It is noted that a Tx subgroup may also comprise one or more virtual transmission antennas/virtual Tx clusters, which can result from the presence of reflecting surfaces. For example, the reflecting surface 114 in FIG. 1B may lead to virtual clusters located in a virtual continuation of array 103 below the plane of the reflecting surface 114, i.e. the floor, and also the virtual or mirrored clusters located in said continuation array could be defined to be included in a Tx subgroup.

The subgroups need not necessarily comprise neighboring clusters but may also be defined according to a sparsely populated subset of ail clusters (providing the antennas in the form of clusters in any case results in a sparsely populated antenna array or aperture). As but one example, a Tx subgroup may comprise every second cluster along one or more directions. Another subgroup may comprise the remaining clusters, which makes clear that apertures of subgroups may also overlap. Such overlap may also result from one and the same cluster being defined a group member of two or more Tx subgroups.

Although various such configurations can be contemplated, some of them may turn out to be not as efficient in terms of image reconstruction as others, which will become clear for example from the discussion on data processing below. Presently preferred Tx subgroups may comprise examples such as those depicted in FIG. 4, wherein neighboring clusters define a quadratic or linear aperture, and different Tx subgroups do not overlap each other.

As an example, for a rule which may govern the definition of Tx subgroups, the effective measurement time affecting the occurrence of image blurring in case of moving objects is dependent on the number of transmission antennas per Tx subgroup to at least some extent, due to the transmission antennas generally transmitting sequentially, and therefore said number of antennas determining the illumination time. It can therefore be contemplated advantageous though not strictly required that the number of transmission antennas per Tx subgroup may be one and the same for all Tx subgroups defined for a system/transmission antenna array configuration.

As another example for a rule governing Tx subgroup definition, a lower limit for the number of transmission antennas per subgroup may result from considerations of a minimum image resolution desired for the object image.

Figure 5:
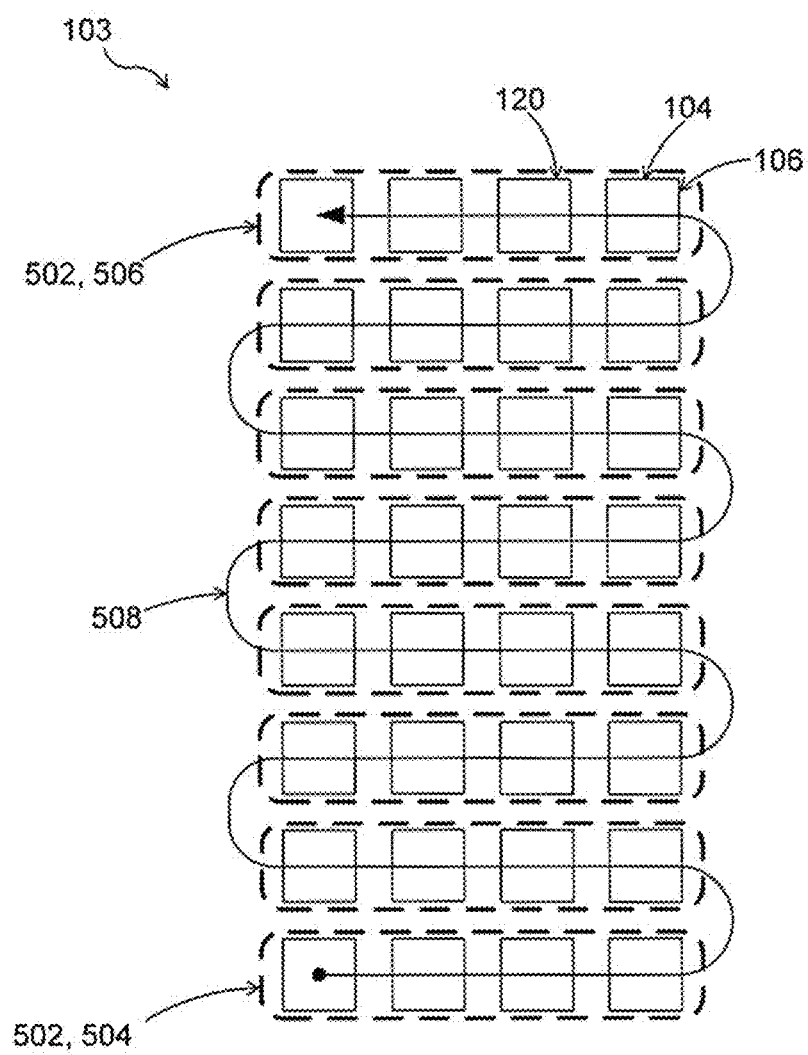
FIG. 5 illustrates a specific example of a Tx subgroup configuration and an illumination sequence which may be defined on the system of FIGS. 1 and 2.

FIG. 5 reproduces the array 103 of FIG. 1A in a plan, view, wherein there are defined eight linearly extending, non-overlapping Tx subgroups 502 as indicated by the dashed lines encompassing each four clusters 120. Assuming the clusters 120 being identical to each other, the number of transmission antennas 104 is the same for each Tx subgroup 502. Further, each transmission antenna and cluster 120 of array 103 is associated to exactly one Tx subgroup 502, i.e. the aperture of subgroups 502 cover the entire array 103, which may be seen, generally advisable in order to make best possible use of the illumination and image resolution capabilities of the available array 103. Tx subgroups covering a row or column of clusters or antennas in an array are simple examples of how to meet with the requirements of a same number of antennas per group and making full use of all available antennas.

The definition of a Tx subgroup is related to the coherent processing of measurement data collected with regard to the illumination affected by the transmission antennas belonging to said subgroup. In particular, performing coherent processing only for subgroups of transmission antennas instead of for all transmission antennas of the entire array leads to a shorter effective measurement time and correspondingly reduced image blurring. It is recalled again that such is due to the fact that the transmission antennas illuminate the scanned object in sequential order, setting aside optimization options such as allowing a parallel illumination of a low number of transmission antennas with frequencies displaced slightly against each other.

Clusters 120 in FIG. 5 also contain receiving antennas, as discussed with reference to FIG. 1B. Generally, in a multi-static mode all receiving antennas may receive parallel at a time such that the measurement time is not adversely affected by a large number of receiving antennas, i.e. embodiments can be contemplated wherein all reception antennas 106 of array 103 of system 100 in FIG. 1A or FIG. 5 may be active in receiving radiation for each of the transmission antennas of all Tx subgroups 502.

However, generally the aperture of a Tx subgroup will focus onto a part of the scanning volume 108 (FIG. 1A) only. For example, the transmission antennas of Tx subgroup 504 can be considered to primarily illuminating a lower portion of scanning volume 108, e.g. the lower legs of a scanned person. The Tx subgroup 506 may primarily illuminate an upper portion of scanning volume 108, e.g. a head of a scanned person. The receiving antennas 106 of clusters 120 in the upper part of array 103 may contribute minor to subimages generated from illumination of the Tx subgroup 504. Similarly, receiving antennas 106 of clusters 120 in the lower part of array 103 may contribute minor to subimages generated from illumination of the Tx subgroup 506.

Therefore it may be contemplated to limit the data collection for a particular Tx subgroup to receiving antennas in or near to the transmission antennas of said Tx subgroup. Such limitation, may have a minor adverse effect on subimage resolution, but can contribute markedly to minimize processing time for image reconstruction. For at least such reasons, according to various embodiments for a Tx subgroup there can be defined an associated Rx subgroup of receiving antennas, the detection signals thereof being considered for contributing to generating the subimage for said Tx subgroup, while measurement data of other receiving antennas outside said Rx subgroup related to the transmission antennas of said Tx subgroup may not be established and/or may be discarded.

Generally, various aspects discussed above for the definition of Tx subgroups may hold for Rx subgroups also. For example, in case of receiving antennas being provided in the form of multiple antenna clusters, it can be contemplated advantageous to constitute Rx subgroups by assembling the receiving antennas of one or more receiving antenna clusters as a whole. The number of receiving antennas can be selected independent of the numbers of transmitting antennas in the associated Tx subgroup. However, according to various embodiments, in order that the resulting effective aperture per Tx subgroup/Rx subgroup be optimized (see below), the number of receiving antennas in the Rx subgroup may be taken to be at least the number of transmitting antennas in the Tx subgroup. Additionally or alternatively, multiple Tx subgroups may share receiving antennas/receiver clusters, i.e. Rx subgroups may overlap each other, and may even share an entire Rx subgroup.

However, a configuration such as that in FIG. 5 may represent an optimum trade-off between desired image resolution and processing time. Namely, the Rx subgroup associated to an Tx subgroup may comprise the same clusters 120 as for the Tx subgroup. For example, for the Tx subgroup 506 comprising the transmission antennas of the uppermost row of clusters 120 of array 103, the associated Rx subgroup may comprise the receiving antennas of said uppermost row of clusters, and similar associations may be defined for the further Tx/Rx subgroups, i.e. the dashed lines 502 in FIG. 5 denote at the same time Tx subgroup, associated Rx subgroup, and thereby a resulting effective aperture.

As can be inferred from FIG. 5, the effective apertures 502 of the Tx subgroups and associated Rx subgroups essentially fully cover the aperture of array 103, which as discussed above is advantageous to make full use of the available imaging capabilities.

For more complex, configurations, wherein for example an Rx subgroup comprises additional clusters over that belonging to the associated Tx subgroup, effective apertures may be larger and may lead to better resolution, but at the expense of lower effective illumination intensity and the overlap in apertures may mean higher computational resource usage. Depending on the details of any specific configuration, while one might want to avoid an overlap in the effective apertures due to an overlap in aperture of the Tx subgroups which would unnecessarily lengthen the effective measurement times, an overlap in effective aperture due to an overlap in Rx subgroups may be tolerated to some extent to partly counteract the adverse effect of lower resolution due to the limited number of transmitting antennas in the Tx subgroups.

In case of separate or only partly overlapping transmitting array and receiving array or arrays, the apertures as used for the Tx and Rx subgroups should also make full use of the available apertures.

In order to minimize effective measurement times, advantageously each of the Tx subgroups 502 should be measured in a contiguous time span, i.e. there should be no overlap or entanglement of illumination periods of different subgroups, and there should be exactly one illumination time per subgroup with minimized time gaps between illumination periods for the various transmitting antennas of the Tx subgroup. This implies that the subgroups are measured sequentially, one after another, and also the total measurement time should be minimized to avoid image blurring due to, e.g. lateral movements. However, there is no specific sequence of how to order or rank the Tx subgroups for the measurements, except that existing scanning sequences may be re-used when upgrading a given scanning system for performing subgroup measurements.

A specific example 508 of a scanning sequence is depicted in FIG. 5, according to which the Tx subgroups 502 are measured one after the other from bottom to top of the array 103. The scanning sequence within any Tx subgroup 502 can be defined independently of the scanning sequence of the subgroups. For example, it is indicated by continuous arrow 508 in FIG. 5 that a scanning sequence may continuously sequentially advance via the clusters 120 of the array 103 and within the subgroups 502. Also within a cluster 120, the transmitting antennas may be controlled for illumination one by one, wherein each transmitting antenna in turn may be controlled for sweeping over a desired frequency range according to a predefined frequency vector, before continuing with the next antenna.

According to other embodiments, for one or more Tx subgroups and/or clusters a different handling may be implemented, wherein all transmission antennas of a given subgroup or cluster in turn radiate a first frequency of a frequency vector, than all antennas sequentially radiate a second frequency of the frequency vector, etc. Also mixtures of said various embodiments can be contemplated, wherein a sweeping pattern may advantageously be selected which minimizes measurement time per Tx subgroup.

In case a particular scanning sequence is implemented which could similarly be used for a fully coherent processing and for a partially coherent processing including the Tx subgroup concept discussed here, a switching between a fully coherently generated object Image and a partly incoherently generated object image can be implemented, wherein the image generation and switching can be based on a single measurement (data acquisition) process only. According to some resulting embodiments, a system may be provided with different operational modes, for example one mode for fully coherent image reconstruction, and one or more other modes for partially incoherent reconstruction, wherein an operator may switch between object images generated by different data-processing performed on the same measurement data.

The array 103 as depicted in FIG. 5 has been implemented with a specific hardware and software implementation. In a fully coherent measurement mode, the measurement time resulted in a value of 16 milliseconds. The scanning mode included switching sequentially through all antennas of the array for a first frequency, then switching sequentially through all antennas of the array for a second frequency, etc.

Then, measurements were, performed, based on the Tx subgroup concept discussed above and processing accordingly coherent subimages for each of the eight depicted Tx/Rx subgroups 502. Specifically, measurements were performed such that for a first antenna 104 of a Tx subgroup 502 a complete frequency scan over a given frequency vector was performed before switching to the next antenna and repeating the frequency sweep, etc. Accordingly from, a cluster perspective, a sequential switching from one cluster 120 to the next as indicated by arrow 508 was performed wherein for each currently transmitting cluster 120 sweeping of the total frequency vector is performed. The total measurement time for said illumination pattern was found to be about 20 milliseconds. However, the effective measurement time (effective illumination time) is only about 20*4/32=2.5 milliseconds, due to each of the Tx subgroups comprising 4 out of a total of 32 clusters 120, the clusters are assumed to each contribute equal to the total measurement time, and coherent processing is performed only for the measurement data of each of the Tx subgroups while the resulting subimages are added incoherently, i.e. rapidly varying phase information is discarded.

In other words, a robustness against image blurring, can be increased by about 16/2.5=640%. An allowable speed of motion of a person to be scanned may be about 2.5 meters/second instead of only about 0.2 meters/second. The former value may readily allow normal walking through or passing by a scanning apparatus. This result may come with an at most moderate loss of resolution and/or loss of phase Information, as discussed below.

Figure 6:
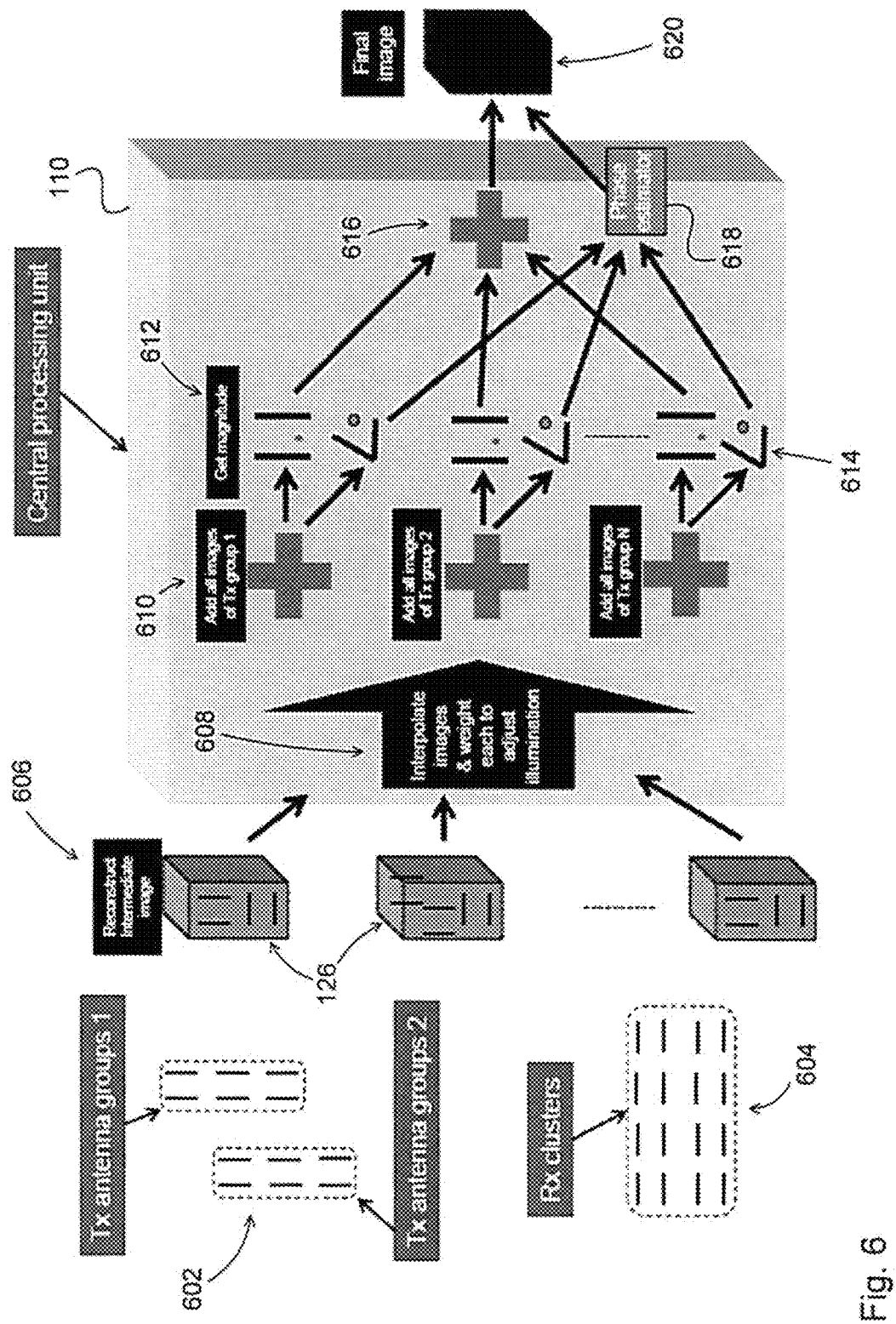
FIG. 6 illustrates further functional aspects of an embodiment of a scanning system, according to the invention.

FIG. 6 schematically illustrates details of an operation of system 100 with a focus on the processing of the collected measurement data. Various Tx subgroups 602 are defined which in the depicted example may share one and the same Rx subgroup 604 as another configuration example complementing the various examples discussed above.

With respect to various LPUs 126 of clusters involved in the Rx subgroup 604, each LPU 126 may be operable to coherently reconstruct 606 an intermediate image from measurement data collected by the receiving antennas of the cluster corresponding to the LPU 126 for at least one transmission antenna of the associated Tx subgroup 602. The intermediate image may include measurement data resulting from all transmission antennas of a cluster involved in the Tx subgroup 602 as available at the LPU 126 (the cluster of a given Tx subgroup may not be identical to the cluster of a given LPU). A given LPU 126 may further be operable to coherently add together the intermediate images available for those clusters being defined to belong to one and the same particular Tx subgroup 602. As a result, less data would have to be transferred from the LPUs to the central CPU 110.

Depending on available processing capabilities at LPU 126 and CPU 110, it can be preferred to perform coherent addition of intermediate images of various transmission antennas, or various Tx clusters, for one Tx subgroup at the CPU. In case there are no processing resources available locally near to the receiving antennas, the processing described here for the LPUs 126 can be performed at one or more central computing facilities, which then requires correspondingly efficient data transmission capabilities between the antennas and the computing facilities.

Referring back to the example depicted in FIG. 6, each LPU 126 transfers its intermediate image or images to the CPU 110. Image interpolation 608 may be performed at CPU 110 in order that the images of the various Tx subgroups may fit into a common framework for the final object image. Processing may also comprise a weighting of the intermediate and/or interpolated images in order that a uniform illumination is achieved over the object image.

Further then, the CPU 110 is operable to coherently add together 610 all intermediate (interpolated, weighted) images belonging to a given Tx subgroup 602, which includes images from all LPUs 126 involved in the associated Rx subgroup 604, to generate one coherent subimage per Tx subgroup. Coherent processing until to and including stage 610 includes consistent complex number handling of the complex-numbered measurement data collected at the LPUs 126.

The further processing 612 involves calculating a magnitude image from each of the complex-valued coherent subimages, similar to what has been described with reference to component 212 in FIG. 2. The magnitude images are added together 616 and the resulting final image 620 can for example be output to storage 218 and/or terminal 112 (FIG. 1). While talking of a final object image, more precisely the object reconstruction 620 may represent the scanning volume 108 by an image volume composed of a plurality of voxels, from which various two-dimensional projections may be generated for display on a screen, projection onto an avatar, etc.

Phase values may be derived 614 from the coherent subimages represented by complex number pixels in stage 612. The phase values may be accepted by a phase estimator 618 to estimate a phase for each of the voxels in the reconstruction volume 620, for example for a predefined time point at the center or at the end of the total measurement time, i.e. the data acquisition phase. An interpolation algorithm known as such may be employed, for example a linear interpolation or a spline interpolation. With this approach, loss of phase information due to incoherent addition of the coherent subimages per Tx subgroup can be balanced to some extent.

While not explicitly shown in FIG. 6, tracking sensor equipment may be provided with the scanning system to allow a relative positioning of the magnitude images, before adding them together at stage 616 in order to minimize any smoothing of a reconstructed image due to movement of the scanned object. It is recalled that the measurement data for the coherent subimages are collected at subsequent time points (more precisely, effective measurement time points), such that, strictly speaking, the coherent subimages represent different sequential stages of motion of a moving subject. An independent tracking sensor enables to balance motion effects between the different images when (incoherently) adding these together. Information from the tracking sensor may, for example, be included in the interpolation step 608 and/or the adding step 616.

Figure 7B:
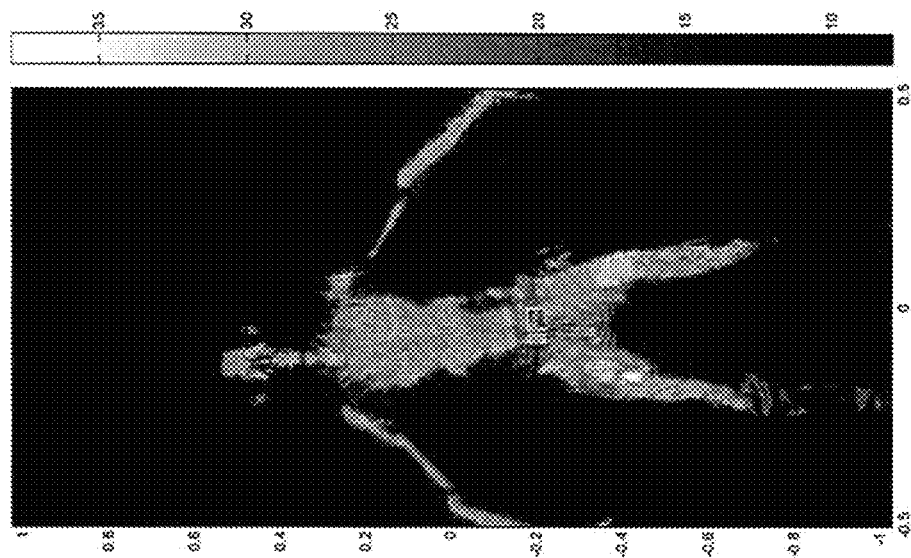
FIG. 7B reproduces an object image corresponding to that of FIG. 7A but resulting from partially incoherent processing.
Figure 7A:
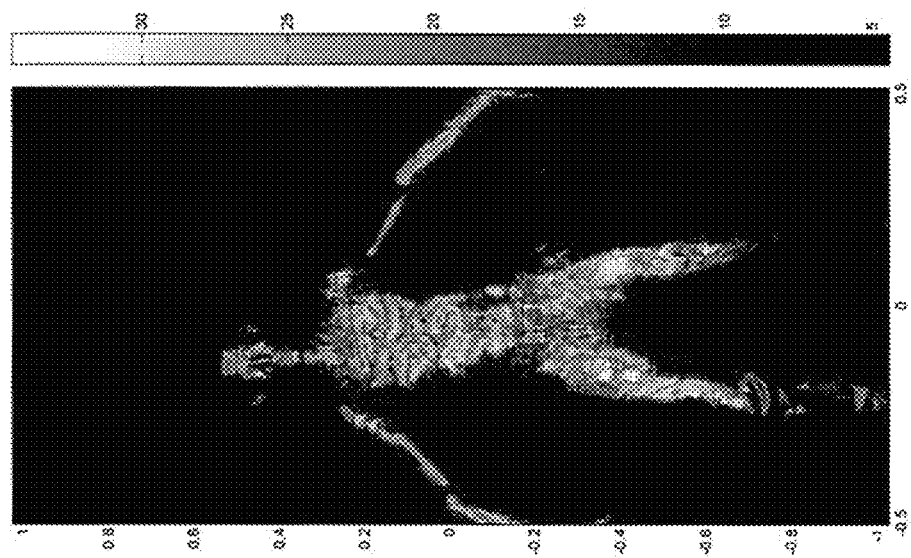
FIG. 7A reproduces an object, image resulting from fully coherent processing for comparison.
Figure 8B:
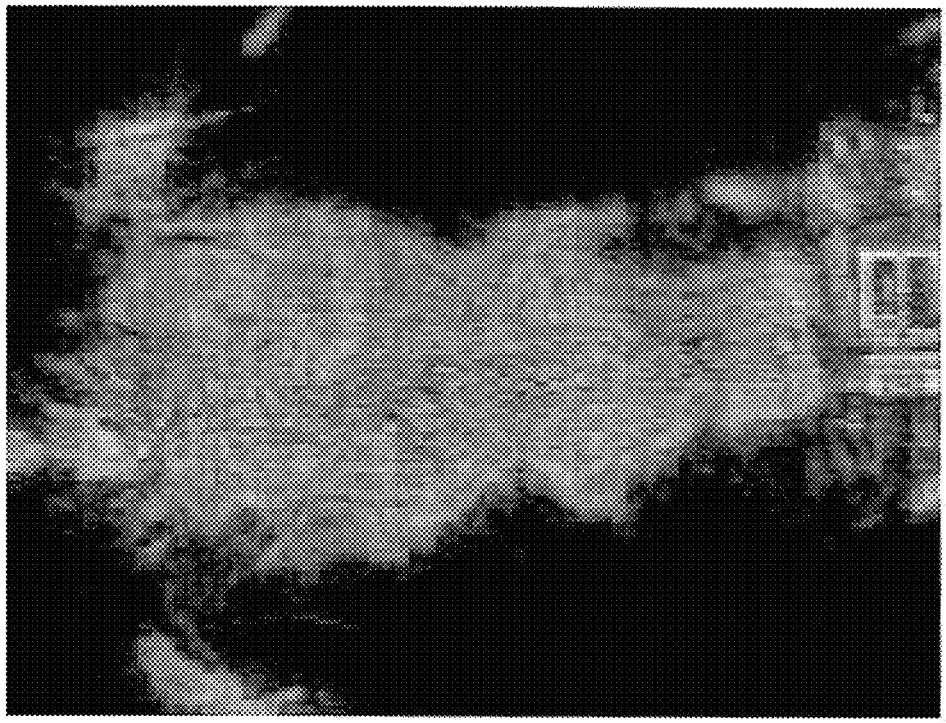
FIG. 8b is an enlarged view on a portion of the object image of FIG. 7B.
Figure 8A:
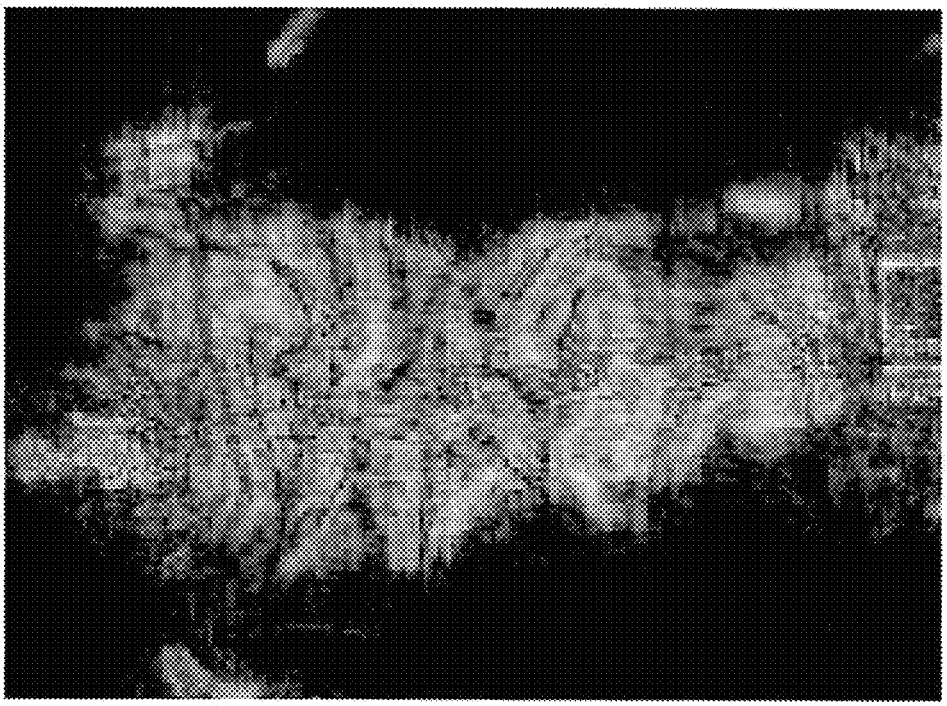
FIG. 8A is an enlarged view on a portion of the object image of FIG. 7A.

FIGS. 7A and 8A reproduce experimental results of a fully coherent image reconstruction, processing for comparison with an embodiment of partially incoherent processing reproduced in FIGS. 7B, 8B, wherein FIGS. 7A, 7B show the entire field of view and FIGS. 8A, 8B show an enlargement focusing on the body of a moving test person. The processing has been performed on one and the same set of measurement data for comparison purposes. The measurement time for the coherent processing was 18 milliseconds which corresponds to the total measurement time for the partially incoherent processing, while an effective measurement time for the partially incoherent processing turns out to be 2.25 milliseconds based on a configuration as shown in FIG. 5 including generating coherent subimages for eight Tx subgroups with 4 clusters each and adding incoherently the subimages as described above.

A comparison of the total views (FIGS. 7A, 7B) as well as the enlargements (FIGS. 8A, 8B) reveals that there are essentially no impairments in image resolution for the partially incoherent processing. However, the fully coherent image reconstruction leads to a strong patterning which is particularly clearly visible for the reconstruction of the body of the test person in FIG. 8A, and which may amongst others be due to the response of the phase-sensitive millimeter-wave system to longitudinal motions during illumination. From FIG. 8B, the appearance of such patterns can be greatly reduced and clear contours of the body of the test person can be recovered for the partially incoherent processing.

The strong patterning particularly visible in FIG. 8A tends not only to blur contours and to wrongly suggest structures where there are none, but also to smear out and let disappear smaller structures, which is exemplarily demonstrated by the belt buckle of the test person near to the lower edge of FIGS. 8A, 8B. In FIG. 8A the buckle is barely visible and has partly disappeared, while it is clearly and completely visible in FIG. 8B.

Figure 9A:
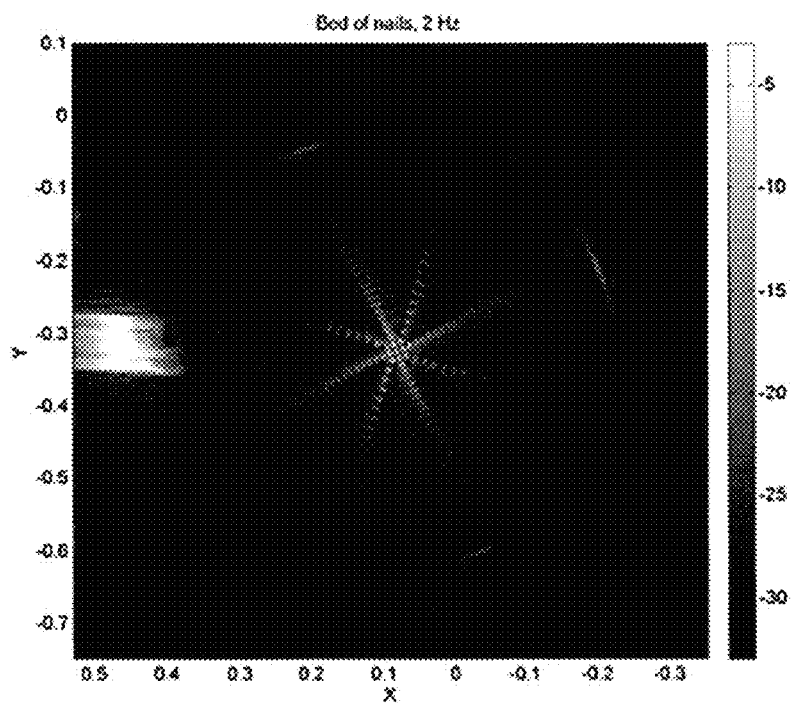
FIG. 9A reproduces a further object resulting from fully-coherent processing for comparison.
Figure 9B:
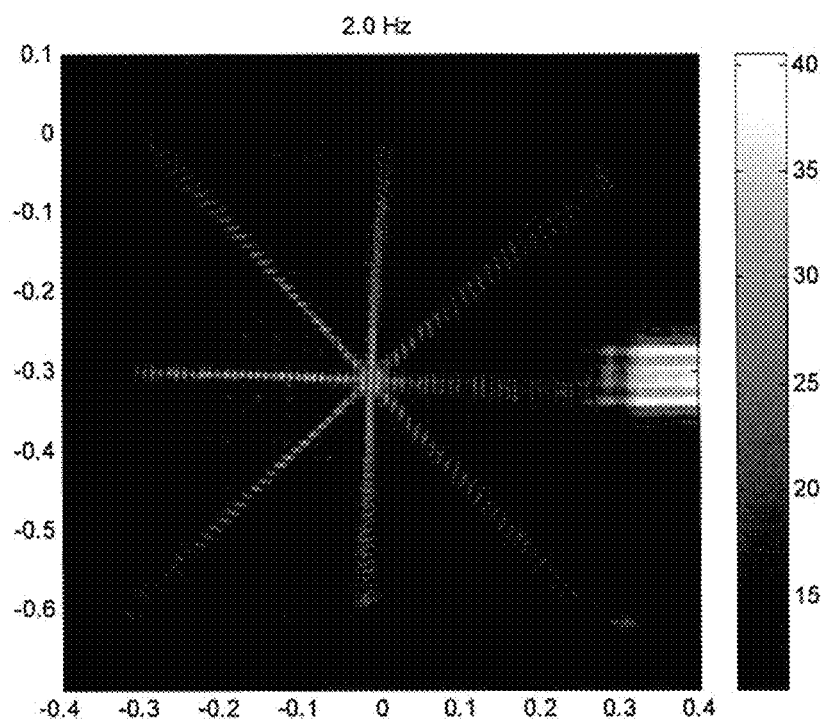
FIG. 9B reproduces an object image corresponding to that of FIG. 9A but resulting partially from in coherent processing.

FIG. 9A show an experimental result of a fully coherent image reconstruction processing for comparison with an embodiment of partially incoherent processing in FIG. 9B, wherein a test object is imaged, namely a bed of nails rotating around its center with a circular frequency of 2 Hertz. As 'nails', aluminum rods with rounded tips have been placed on a quadratic piece of pyramidal absorber material.

While the inner nails move a comparatively short distance during the total measurement time, the outer nails travel a long distance with a velocity of about 6 meters per second and as a result, they are smeared out to the effect that the very outer nails tend to shade and even entirely disappear in the fully coherently reconstructed image of FIG. 9A. The shorter effective measurement time of the partially incoherent processing according to FIG. 9B leads to the fast moving of outer nails being imaged considerably more clearly with less shading, while any degradations in image resolution remain moderate, if at all visible.

Image blurring in the case of conventional, fully coherent reconstruction which leads to small structures being smoothed out and even disappearing, patterns occurring which indicate structures where there are none, makes it difficult for operator personnel to decide on the presence or absence of objects or a type or kind of object which may be carried by a scanned person under the clothing.

Without wanting to be limited by theory, the image blurring can be understood as amongst others resulting from phase sensitivity of a fully coherent millimeter/micrometer-wave system. Generally, blurring may occur when an imaged object moves a distance comparable to an illumination wavelength during measurement, i.e. illumination time. For the systems under consideration, small longitudinal movements of the order of or less than a millimeter during measurement may result in serious phase errors and resultant image quality deterioration. In fact, phase shifts due to comparatively small motions in longitudinal direction (as opposed to lateral movements) during measurement time may for example lead to random extinctions such that the reconstructed image shows slurry features, as visible in FIG. 8A.

Such motions during measurement destroy coherence, although coherence is assumed in fully coherent reconstruction. Movements allowable to avoid deterioration of image quality are clearly below normal walking speed, i.e. walk-through scanning will be allowable only for considerably smaller measurement times which may not be reachable with existing implementations to date.

Measurement times in fully coherent reconstruction result from the coherent (i.e. phase-sensitive) addition of sequential measurements. Abandoning the coherent processing at an appropriate stage in the reconstruction processing therefore can lead to shorter effective measurement times.

Incoherent processing, i.e. addition of subimages by magnitude only and thereby discarding rapidly varying phase information enables implementing shorter effective measurement times, which minimizes occurrences of arbitrary phase errors due to object motion and therefore results in disappearance of slurry features.

However, incoherent processing (discarding phase information) can lead to loss of image resolution. Therefore, when appropriately reconfiguring one or both of the data collection and the data processing to achieve the desired shorter effective measurement times, the re-configurations have to be such as to minimize adverse resolution effects.

According to various embodiments, units of data packets are considered, which each result from a short measurement time and which are intended to result in a single subimage. Data collection and/or data processing may then be re-organized to achieve such wanted data packets. For example, while conventionally a first frequency may be transmitted sequentially by all transmitting antennas of an array, followed by a second frequency, etc., the measurement phase may be re-configured according to various embodiments such that at least partially a switching is performed from one antenna to the next and for each antenna the entire desired, frequency sweep is performed at once. At least, a full frequency sweeping may be performed in a concurrent single time block for all antennas of a Tx subgroup.

The data collected for a Tx subgroup can be coherently processed to achieve a coherent (phase-sensitive) subimage. In order to achieve a shorter effective measurement time, it is generally advisable to define Tx subgroups wherein the number of antennas per subgroup is considerably smaller than the total number of antennas in the array or system. On the other hand, the number of antennas should be large enough in order to achieve a minimum desirable image resolution per subimage. Therefore according to various embodiments a number of Tx subgroups is presently preferred to be between 2, 3, 4, or more, and up to or below 10 Tx subgroups per array. The Tx subgroups can further appropriately be defined, e.g. with regard to an aperture thereof, to minimize adverse effects on resolution, to minimize processing and/or implementation efforts on existing systems, etc.

According to various embodiments, one or more of the above-discussed approaches can lead to an image reconstruction which is robust against image blurring in phase-sensitive scanning systems for objects moving, for example, with walking speed. According to various embodiments, total measurement times and/or processing times are, if at all, at most marginally increased. The processing adaptation can be implemented on existing hardware/software implementations. Adverse effects on image resolution can be minimized by appropriate definition of Tx subgroups, implementing an auxiliary phase estimation to correct for phase errors, etc.

While the invention has been described in relation to its preferred embodiments, it is to be understood that this description is intended non-limiting and for illustrative purposes only. In particular, various combinations of features wherein the features have been described separately hereinbefore are apparent as advantageous or appropriate to the skilled artisan. Accordingly, it is intended that the invention be limited only by the scope of the claims appended hereto.

While various embodiments of the present invention have been described above, it should be understood that they have been presented by way of example only, and not limitation. Numerous changes to the disclosed embodiments can be made in accordance with the disclosure herein without departing from the spirit, or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed:

1. Method for reconstructing an image of an object, the object positioned adjacent a reflecting surface, comprising the steps of:
    illuminating the object by transmitting millimeter-wave and/or micrometer-wave radiation from an array of transmitting antennas;
    detecting signals of radiation reflected by the object with an array of receiving antennas and representing the detected signals by complex-numbered measurement data;
    performing coherent processing of the measurement data by a first component of a central processing unit or a local processing unit including complex number computations for image reconstruction;
    establishing Tx subgroups of transmitting antennas for which coherent processing is performed by the local processing unit to achieve coherent subimages, whereby the Tx subgroup comprises one or more virtual transmission antennas or virtual Tx clusters resulting from the reflecting surface;
    establishing Rx subgroups of the receiving antennas, whereby the receiving antennas of each TX subgroup are located in or near the transmitting antennas of the associated TX subgroup and are configured to detect signals of radiation transmitted from the transmitting antennas of any associated Tx subgroup;
    calculating magnitude values by a second component in the central processing unit each indicative of a magnitude of a complex number to obtain a magnitude subimage for each of the coherent subimages and generating the object image by adding the magnitude subimages; and
    implementing multiple Tx clusters as a sparse array.

2. The method according to claim 1,
    whereby the Tx subgroups are sequentially measured such that each Tx subgroup is measured by the local processing unit in a single, contiguous, non-overlapping time period.

3. The method according to claim 1,
whereby the steps of establishing for each Tx subgroup the specific Rx subgroup of receiving antennas contribute to achieve the coherent subimage of the corresponding Tx subgroup is buffered in a storage component associated with the central processing unit.

4. The method according to claim 1, further comprising providing phase values of the coherent subimages by a third component in the central processing unit for estimating phase values for the object image.

5. A system for reconstructing an image of an object, comprising:
- an array of transmitting antennas adapted to illuminate the object by transmitting millimeter-wave and/or micrometer-wave radiation;
- an array of receiving antennas adapted to detect signals of radiation reflected by the object;
- a reflecting surface positioned adjacent the object;
- at least one component adapted to represent the detected signals by complex-numbered measurement data;
- at least one component adapted to perform coherent processing of the measurement data including complex number computations for image reconstruction;
- at least one component adapted to establish Tx subgroups of transmitting antennas for which coherent processing is performed to achieve coherent subimages and adapted to establish Rx subgroups of the receiving antennas, whereby the receiving antennas of each Tx subgroup are located in or near the transmitting antenna of the associated Tx subgroup and are limited to configure signals of radiation transmitted from the transmitting antennas of any associated Tx subgroup, and whereby the Tx subgroup comprises one or more virtual transmission antennas or virtual Tx clusters resulting from the reflecting surface;
- at least one component adapted to calculate magnitude values each indicative of a magnitude of a complex number to obtain a magnitude subimage for each of the coherent subimages and to generate the object image by adding the magnitude subimages; and
- multiple Tx clusters are implemented as a sparse array.

6. The system according to claim 5,
wherein the Tx subgroups comprise each one and the same number of transmitting antennas.

7. The system according to claim 5,
wherein the Tx subgroups comprise mirrored transmitting antennas.

8. The system according to claim 5,
wherein in case a Tx subgroup has the associated Rx subgroup, the number of receiving antennas of the Rx subgroup is at least the number of antennas of the associated Tx subgroup.

9. The system according to claim 8,
wherein effective apertures of Tx subgroups and associated Rx subgroups fully cover an aperture of the transmitting antenna array and/or the receiving antenna array.

10. The system according to claim 5,
wherein multiple Rx antenna clusters comprise each a plurality of the receiving antennas and further comprising each a processing module for performing at least a part of the coherent processing.

11. The system according to claim 10,
wherein the central processing unit is adapted to perform the remaining of the coherent processing and to establish the object image.

12. The system according to claim 11,
wherein the Rx antenna cluster is adapted to perform coherent processing to generate an intermediate image for a Tx subgroup, and
wherein the central processing unit is adapted to perform a coherent processing including complex adding of multiple intermediate images to generate the coherent subimages.

13. The system according to claim 12,
wherein the central processing unit is adapted to perform at least one of an image interpolation and an incoherent addition of the coherent subimages.

14. The system according to claim 5,
wherein the system comprises tracking sensor equipment for relative positioning of the magnitude images before adding and/or volume limiting intermediate images.

15. A computer program comprising program code portions for performing the steps of:
- illuminating an object by transmitting millimeter-wave and/or micrometer-wave radiation from an array of transmitting antennas, the object positioned adjacent a reflecting surface;
- detecting signals of radiation reflected by the object with an array of receiving antennas and representing the detected signals by complex-numbered measurement data;
- performing coherent processing of the measurement data including complex number computations for image reconstruct ion;
- establishing Tx subgroups of transmitting antennas for which coherent processing is performed to achieve coherent subimages, whereby the Tx subgroup comprises one or more virtual transmission antennas or virtual Tx clusters resulting from the reflecting surface;
- establishing Rx subgroups of the receiving antennas, whereby the receiving antennas of each TX subgroup are located in or near the transmitting antennas of the associated TX subgroup and are configured to detect signals of radiation transmitted from the transmitting antennas of any associated Tx subgroup;
- calculating magnitude values each indicative of a magnitude of a complex number to obtain a magnitude subimage for each of the coherent subimages and generating the object image by adding the magnitude subimages; and
- implementing multiple Tx clusters as a sparse array.

* * * * *